March 25, 1958    L. H. MESSINGER ET AL    2,828,111
PLUNGER REACTOR
Filed May 2, 1955

INVENTORS
LESTER H. MESSINGER
WILBUR L. PATTON
BY Cullen D. Frey
ATTORNEY

United States Patent Office

2,828,111
PLUNGER REACTOR

Lester H. Messinger, Newark, and Wilbur L. Patton, Wilmington, Del., assignors to E. I. du Pont de Nemours & Company, Wilmington, Del., a corporation of Delaware Application May 2, 1955, Serial No. 505,405

3 Claims. (Cl. 259—4)

This invention relates to a plunger mixer or reactor particularly suitable for use in carrying out polymerizations of materials which during the course of polymerization become very viscous, plastic or rubber-like masses.

In the polymerization of materials which during the course of the reaction become very viscous, rubbery or plastic, mixers of the Werner-Pfleiderer or Banbury types are usually employed in order to accomplish the mechanical working and mixing necessary to bring about complete reaction. These types of mixers, however, are primarily useful only as batch equipment, and it is necessary to remove the material from these mixers in rather large quantities. Where careful control of the material being polymerized is required to produce uniform quality and the polymerization must be stopped at a definite point to prevent over-polymerization, and particularly where the temperature of the mass in the mixture due to the heavy mechanical working is at a point at which polymerization is accelerated, it is difficult or impossible to work the necessary stabilizing agents into such mass in that type of mixer. In the elastomer field where the polymer is mixed in the Werner-Pfleiderer or Banbury type mixer, the product is removed as quickly as possible when it has reached the desired state of polymerization and the stabilizing agent is worked into it on a rubber mill. The length of time required for the removal of the reaction mass from the mixer so that it can be worked in other equipment is rather critical, and the temperature control in these large mixtures is rather difficult due to the large power input and the poor heat transfer characteristics of the rubbery material which results at the end of the polymerization.

In the preparation of the urethane rubbers in which a polytetramethylene ether glycol is mixed with a diisocyanate to form a polyalkylene ether polyurethane diisocyanate which is then chain extended by the addition of water, the delay in transferring the material from a Werner-Pfleiderer mixer to a rubber mill can cause additional polymerization which produces a produce that is difficult to work or mill and, in some cases, a product which is not satisfactory for commercial use as a curable elastomer.

It is therefore an object of the present invention to provide a novel plunger reactor suitable for use in carrying out the polymerization of materials which during the course of the polymerization result in very viscous, plastic or rubber-like products from which the polymerization product can be continually removed and immediately transferred to other apparatus when further working, stabilization or other type of treatment is to be carried out.

The apparatus of the present invention, which can be used in the continuous preparation of polymeric materials, is more particularly illustrated in the accompanying drawing which forms a part of the present application, in which.

Figure 1:
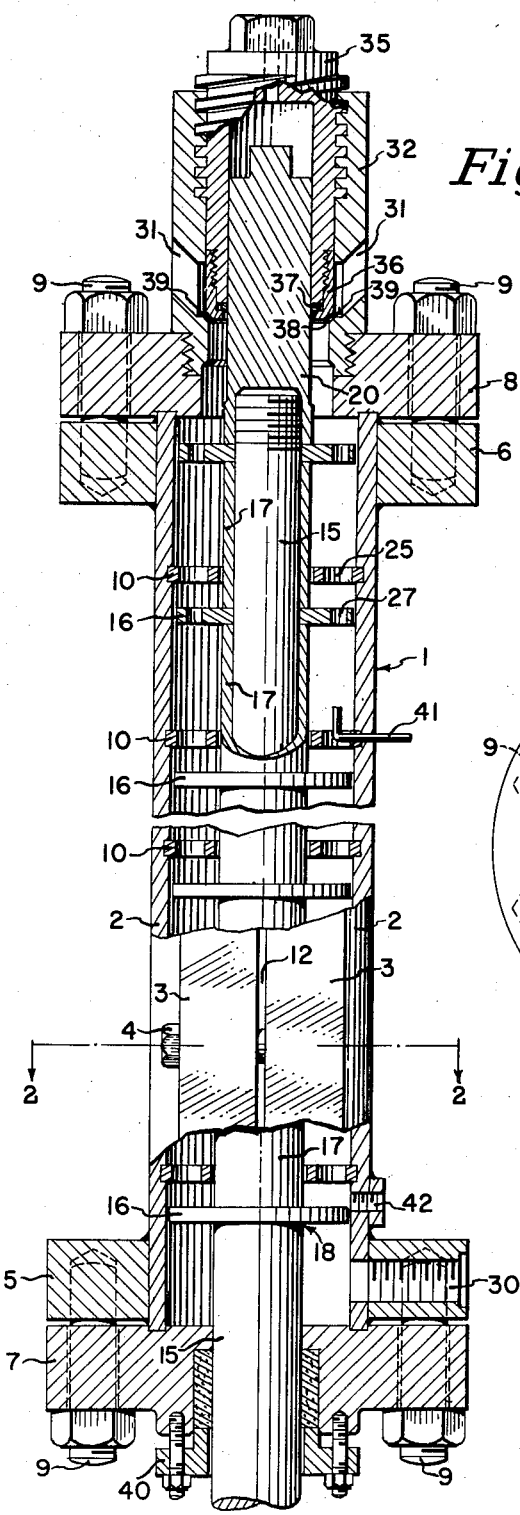
Figure 1 is a vertical view of the apparatus partially in section.
Figure 2:
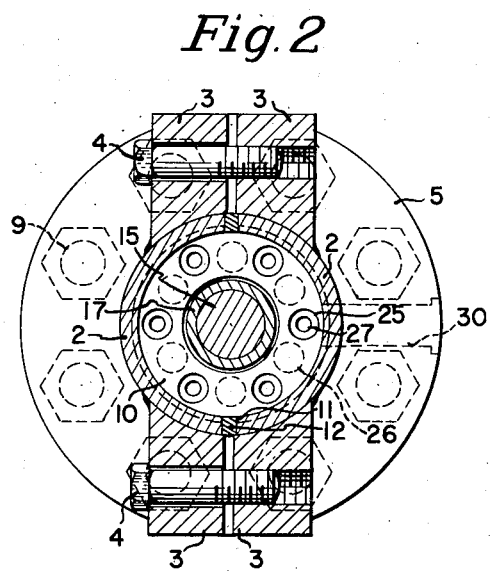
Figure 2 is a cross-section of the apparatus of Figure 1 taken on the line 2—2.

The plunger reactor of this invention comprises a body 1 having an internal cylindrical bore. For ease in disassembling, the body 1 is comprised of two semi-cylindrical members 2 provided with longitudinally extending cooperating flanges 3 whereby the two semi-cylindrical members may be bolted firmly together with cap screws 4. Securely fixed at the end of each of the semi-cylindrical members 2 are flanges 5 and 6 to which end plates 7 and 8 may be attached by means of bolts 9.

At spaced intervals in the body member 1, perforated discs 10 are arranged in circumferential grooves in the inner wall of the cylinder, which discs are notched as at 11 to receive the steel spacers 12 which form a seal between the two semi-cylindrical members 2 when they are bolted tightly together. This prevents rotation of the discs 10. A shaft 15 is arranged to reciprocate longitudinally in the cylindrical body 1 through end plates 7 and 8. This shaft is fitted with perforated discs 16 which are held in spaced relation on the shaft by means of spacers 17, the bottom disc 16 resting against a shoulder 18 on the shaft while the discs and spacers are clamped tightly against the shoulder by the shaft extension 20 which screws on to the top of the shaft 15.

The shaft 15 may be reciprocated by an conventional means such as a motor operating through a gear reducer to an adjustable eccentric which is then connected to the shaft by a connecting rod and cross-head, whereby the shaft 15 is prevented from rotating. The perforations 25 in the disc 10 are arranged in a staggered relation to corresponding sized holes 26 in the discs 16. To prevent undue pressure in the cylinder, especially where the material being polymerized becomes very heavy, smaller holes 27 may be provided in the discs 16 concentric with holes 25 in the disc 10. An inlet port 30 is arranged in the lower flange 5 through which the material to be polymerized may be continually introduced into the apparatus under pressure by any suitable pump mechanism, and outlet slots 31 are provided in the cap member 32 which is screw-threaded into the end plate 8. A plug 35 screw-threaded into the cap 32 is provided with a packing gland 36 in which a packing ring 37 may be tightly clamped against reciprocating end piece 20. Packing gland member 36 is provided with a shoulder 38 which is shaped to fit into the end of the cap 32 to form an adjustable outlet 39 which can be varied by screwing the plug 35 in or out of the cap 32 to vary the back pressure and control the speed at which the material is permitted to leave the reactor. A packing gland at 40 seals the lower end of the shaft.

The length of travel of the plunger (reciprocating shaft 15 and discs 16) can be varied from a very small clearance between the movable and fixed discs to as much as a quarter of the distance between the fixed discs. Normally it is preferred to operate with very small clearances, approximately 0.004 of an inch being preferred. The clearance between the edges of the discs attached to the moving shaft and the wall of the cylinder, as well as the distance between the bore of the fixed discs and the reciprocating shaft, may vary, although preferably clearance should be merely such as to give a good operating fit. 0.008 in. clearance is found to be satisfactory.

The size and distribution of the perforations in the discs will be a matter of choice and will be dependent upon the nature of the material to be forced through the reactor. Obviously, less viscous materials can be operated with discs having a greater number of smaller holes, whereas material which becomes very viscous or rubbery will be more satisfactorily handled with discs having larger holes. Preferably at least part of the holes in the stationary discs and in the moving discs should be in line with each other or closely in line so that a direct hydraulic pressure can be applied to the material being introduced and a balanced passage through the reactor be assured.

Thermocouples can be inserted in the apparatus for measuring the temperature, as at 41 where the thermocouple passes through the wall into a stationary disc into one of the holes that aligns with a hole in the movable disc, so that there is no lateral force shoving on the thermocouple and the temperature of the moving mass may be directly measured.

The number of discs to be used in any adaptation of the apparatus is not critical, and the rate of movement of the shaft may vary. From 2 to 20 strokes per minute will usually be found satisfactory.

The flow of the reaction mass through the reactor, that is, the residence time in the reactor, is controlled by a conventional positive displacement pump connected to the inlet 30. The back pressure of the reaction mass is controlled by regulating the orifice at 39. The pressure on the system may be measured by a pressure measuring device which may be attached at the opening 42. Usually pressures of from 200 to 800 pounds per square inch gauge pressure will be employed when polymerizing materials which become very viscous or rubber-like.

The degree of polymerization desired will of course control the residence time in the plunger reactor. In many cases the polymerization reaction may be started in other apparatus and as the material becomes more viscous may be introduced into the plunger type reactor. The temperature at which the polymerization may be carried out will of course vary with the particular materials to be polymerized, and therefore the cylindrical portion of the reactor may be jacketed for the application of heat or to effect a cooling if the material is of such a viscous nature that an undue amount of heat is generated in the working. Where different temperatures are to be maintained throughout different zones in the reactor, it is of course understood that separate heating or cooling means may be provided along the length of the reactor.

The following specific example of the preparation of urethane elastomer is given to illustrate the use of the apparatus of this invention, it being understood that other types of elastomeric or plastic polymers may be produced where it is desired to carry out the polymerization while working in a viscous or plastic state.

*Example*

The plunger reactor as illustrated in the accompanying drawings, which is used to carry out the process of this example, comprises a cylinder 2⅞ inches in diameter and 22½ inches long in which both the movable and stationary discs contain six one-half inch diameter holes, with ⁵⁄₁₆ inch diameter holes in the movable disc 16 concentrically arranged with the holes in the disc 10. The reciprocating shaft is operated at 2 strokes per minute. A polytetramethylene ether glycol of molecular weight 3060 and having a moisture content of 0.2% is mixed at the rate of 35 grams per minute with 4.1 grams per minute of 2,4-tolylene diisocyanate in a prepolymer mixer of any desired type at a temperature of from 50° to 60° C. From the prepolymer mixer the prepolymer reaction mass is pumped by a positive displacement pump to a hold column which is provided with slow agitation, in which the prepolymer is held at a temperature of from 70° to 75° C. The prepolymer is fed into the hold column from the bottom and taken out at the top, and the residence time in the hold column is approximately 5½ hours. The prepolymer flows from the top of the hold column at a constant rate to a mixer where it is mixed with water which is added at the rate of one gram per minute. This mixer is provided with good agitation to give intensive mixing of the prepolymer with the water. This mixing is carried out for a period of about 2 minutes and the material thus mixed is fed by a double screw pump at a temperature of about 50° to the plunger reactor of the present invention. The residence time in the reactor is about 45 minutes and the temperature at the exit 31 is about 105° C. Under these conditions the product extrudes from the discharge openings 31 as a rubbery ribbon and is directly removed to the usual rubber mill where 0.8 part of piperidine is added for each 100 parts of the polymer. This inhibits further polymerization and stabilizes the polymer.

The resulting polymer may be cured by milling into each 100 parts of polymer 6 parts of the curing agent, such as 1,3-bis(3-isocyanato-4-methyl phenyl)-urea, after which it may be heated under pressure in a mold for 30 minutes at 134° C. The resulting rubbery product exhibits the following properties:

Tensile strength at the break at 25° C__ 5100 lbs./sq. in.
Tensile strength at the break at 70° C__ 3310 lbs./sq. in.
Modulus at 300% elongation at 25° C__ 700 lbs./in. in.
Elongation at 25° C_____ 500%.

As stated above, other types of elastomeric or plastic polymers may be produced in the novel plunger reactor of this invention, which provides positive agitation of any type of fluid up to heavy, viscous, rubber-like masses.

While the apparatus of the present invention is illustrated operating in a vertical position, it will be obvious that it may be operated in any desired position since the material may be held in it under any desired pressure, depending upon the pressure applied at the entrance and the throttle effect of the valve 39 at the exit. It will be obvious that, while the apparatus has been disclosed as primarily useful for carrying out polymerization reactions in which heavy viscous or rubbery masses are obtained, it can be used as a mixer for any viscous or plastic material and is not limited in its use to the formation of any particular type of product.

We claim:

1. A plunger mixer for very viscous or rubber-like material comprising a closed cylindrical body member provided with spaced discs held in a fixed position with relation to each other; a plunger arranged to reciprocate through aligned holes in said discs, said plunger carrying discs fixed in space relation thereon, which are alternately arranged with respect to the discs in the body member and spaced substantially the same distance apart, the plunger being adapted to move longitudinally in the cylindrical body a distance substantially equal to the distance between the discs fixed in the cylindrical body, all of said discs being provided with relatively small apertures through which material may flow; the clearance between the edges of the discs attached to the plunger and the wall of the cylinder, and the distance between the bore of the fixed discs and the plunger, being sufficient to give only a good operating fit; an opening through which the material may be fed into said body member at one end under sufficient pressure to move the very viscous or rubber-like material through the mixer, and an adjustable opening through which the material may be discharged at the opposite end; and means for controlling the rate of discharge of the material from said mixer.

2. A plunger mixer for very viscous or rubber-like material comprising a closed cylindrical body member provided with spaced discs held in a fixed position with relation to each other; a plunger arranged to reciprocate through aligned holes in said discs, said plunger carrying discs fixed in spaced relation thereon which are alternately arranged with respect to the discs in the body member and spaced substantially the same distance apart, the plunger being adapted to move longitudinally in the cylindrical body a distance substantially equal to the distance between the discs fixed in the cylindrical body, all of said discs being provided with apertures through which the material may flow; the clearance between the edges of the discs attached to the plunger and the wall of the cylinder, and the distance between the bore of the fixed discs and the plunger, being sufficient to give only a good operating fit; a plurality of relatively small holes in each set of discs being in alignment to prevent undue pressure being created as the plunger is reciprocated when very viscous or rubbery materials are being worked; an opening through which material may be fed into said body member at one end under sufficient pressure to move the very viscous or rubber-like material through the mixer, and an adjustable opening through which the material may be discharged at the opposite end; and means for controlling the rate of discharge of the material from said mixer.

3. A plunger mixer for very viscous or rubber-like material comprising a closed cylindrical body member constructed of matching semi-cylindrical bodies provided with flanges whereby they may be clamped tightly together yet be readily disassembled, said cylindrical body being provided with spaced discs held in fixed position in circumferentially arranged grooves in the body member; means for preventing rotation of said discs; a plunger arranged to reciprocate through centrally aligned holes in said discs, said plunger carrying discs fixed in spaced relation thereon, said discs being spaced equally to the spacing of the discs in said body member whereby the plunger may be reciprocated within the limits of the discs spacing, all of said discs being provided with relatively small apertures through which the material may flow; the clearance between the edges of the discs attached to the plunger and the wall of the cylinder, and the distance between the bore of the fixed discs and the plunger, being sufficient to give only a good operating fit; an opening through which the material may be fed into said body member at one end under sufficient pressure to move the very viscous or rubber-like material through the mixer, and an adjustable opening through which the material may be discharged at the opposite end; and means for controlling the rate of discharge of the material from said mixer.

References Cited in the file of this patent
UNITED STATES PATENTS

| | | |
|---|---|---|
| 384,518 | Gale | June 12, 1888 |
| 541,658 | Crooke | June 25, 1895 |
| 1,017,690 | Ricker | Feb. 20, 1912 |
| 2,667,407 | Fenske et al. | Jan. 26, 1954 |